W. L. GILL.
Photographic Plate-Holders.
No. 133,526.                  Patented Dec. 3, 1872.
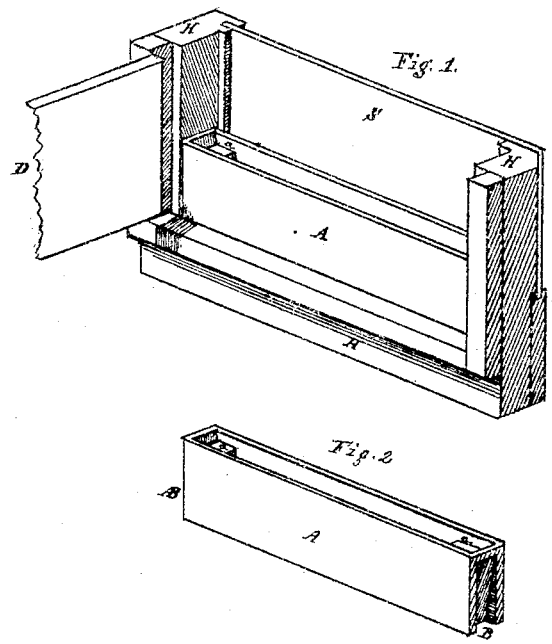
Witnesses.
Thomas J. Davis.
Jacob Stauffer.
Inventor.
Wm L Gill

UNITED STATES PATENT OFFICE.

WILLIAM L. GILL, OF LANCASTER, PENNSYLVANIA.

IMPROVEMENT IN PHOTOGRAPHIC-PLATE HOLDERS.

Specification forming part of Letters Patent No. 133,526, dated December 3, 1872.

*To all whom it may concern:*

Be it known that I, WILLIAM L. GILL, of the city of Lancaster, in the State of Pennsylvania, have invented certain Improvements in the Manner of Collecting the Silver Solution from Photographic Plates, of which the following is a specification:

The object of my invention is to provide a removable open well, which also supports the plate and collects all the drippings without waste or liability to overflow by clogging up, and which is easily removed for being emptied or for the inspection of the holder. The gutters now in general use, with a tube attachment, have a great tendency to clog up by incrustation or air-bubbles being formed over the discharging-orifice, causing an overflow, which not only corrodes and soon renders the plate-holder worthless, to say nothing of the soiling of carpets, &c., but it is a serious waste of a costly material, as taught by experience, besides the annoyance and vexation to operators, which objections my invention will obviate.

The drawing illustrates an ordinary plate-holder in part, with my well in place and the well itself detached. This is readily understood by simply referring to the letters marked thereon: H, the ends and bottom of the holder; D, the hinged door; and S, the slide, Figure 1. A shows the well in place, and is held in wedge-pieces on the holder, fitting into the beveled slots B, Fig. 2. In the ends of the well A sunken ledges *a* are shown inside across the well, for the support of the plate when in the holder. These ledges are slightly inclined inward, the two sides, ends, and bottom forming the open cell or well, to receive the drippings of the silver solution from photographic plates in an ordinary holder.

These wells, with their beveled ends and ledges, are easily molded in glass, as a single article to the trade, or made of any other material which will not corrode and can be made available for the purpose.

I claim no novelty in the holder.

What I claim as my invention, and desire to secure by Letters Patent, is—

The well A with its side ledges *a* and bevel-slotted ends B, or their equivalent, as a whole, substantially, made removable, in the manner and for the purpose specified.

WM. L. GILL.

Witnesses:
THOMAS J. DAVIS,
JACOB STAUFFER.